US012765555B2

(12) United States Patent
Itaya

(10) Patent No.: US 12,765,555 B2
(45) Date of Patent: Oct. 20, 2026

(54) METHOD FOR CONTROLLING WEEDS

(71) Applicant: KUMIAI CHEMICAL INDUSTRY CO., LTD., Tokyo (JP)

(72) Inventor: Daigo Itaya, Tokyo (JP)

(73) Assignee: KUMIAI CHEMICAL INDUSTRY CO., LTD., Tokyo (JP)

( * ) Notice: Subject to any disclaimer, the term of this patent is extended or adjusted under 35 U.S.C. 154(b) by 642 days.

(21) Appl. No.: 18/272,493

(22) PCT Filed: Jan. 19, 2022

(86) PCT No.: PCT/JP2022/001868
§ 371 (c)(1),
(2) Date: Jul. 14, 2023

(87) PCT Pub. No.: WO2022/158500
PCT Pub. Date: Jul. 28, 2022

(65) Prior Publication Data

US 2024/0138412 A1 May 2, 2024

(30) Foreign Application Priority Data

Jan. 19, 2021 (JP) ................................ 2021-006180

(51) Int. Cl.
*A01N 43/80* (2006.01)
*A01P 13/00* (2006.01)

(52) U.S. Cl.
CPC .............. *A01N 43/80* (2013.01); *A01P 13/00* (2021.08)

(58) Field of Classification Search
CPC ................................ A01N 43/80; A01P 13/00
See application file for complete search history.

(56) References Cited

U.S. PATENT DOCUMENTS

| | | | |
|---|---|---|---|
| 2004/0110749 | A1 | 6/2004 | Nakatani et al. |
| 2005/0215797 | A1 | 9/2005 | Nakatani et al. |
| 2007/0249844 | A1 | 10/2007 | Nakatani et al. |
| 2014/0228217 | A1 | 8/2014 | Yamada et al. |
| 2017/0006870 | A1 | 1/2017 | Arai et al. |
| 2022/0386613 | A1 | 12/2022 | Suzuki |
| 2023/0012374 | A1 † | 1/2023 | Uchida |
| 2023/0057759 | A1 | 2/2023 | Aronhime et al. |
| 2024/0065269 | A1 | 2/2024 | Itaya |

FOREIGN PATENT DOCUMENTS

| | | |
|---|---|---|
| CL | 202301974 | 7/2023 |
| EA | 030394 | 7/2018 |
| RU | 2 594 522 | 8/2016 |
| WO | 02/062770 | 8/2002 |
| WO | 2004/013106 | 2/2004 |
| WO | 2021/002484 | 1/2021 |
| WO | 2021/144796 | 7/2021 |

OTHER PUBLICATIONS

Office Action issued Feb. 27, 2025 in corresponding Russian Application No. 2023121599, with English translation.
Mangin et al., "Influence of Tillage on Control of Wild Oat (*Avena fatua*) by the Soil-applied Herbicide Pyroxasulfone", Weed Science Society of America, vol. 65, Issue 2, Mar. 2017, pp. 266-274.
"BSE" M.: "Soviet Encyclopedia", 1976, edition 3, tom 25, p. 29, col. 73.
Nakatani et al., "Development of the novel pre-emergence herbicide pyroxasulfone", Journal of Pesticide Science, vol. 41, No. 3, pp. 107-112, 2016.
Australian Pesticides and Veterinary Medicines Authority: Public Release Summary on the Evaluation of the New Active Pyroxasulfone in the Product Sakura® 850 WG Herbicide, 2011, Oct. 2011.
Pre-Grant Opposition Representation Filed in corresponding Indian Patent Application No. 202327053483, filed Dec. 26, 2024.
Yoshihiro Yamaji et al., "Soil and environmental factors affecting the efficacy of pyroxasulfone for weed control", Journal of Pesticide Science, vol. 41, No. 1, pp. 1-5, 2016.
International Search Report (ISR) issued Mar. 8, 2022 in International (PCT) Application No. PCT/JP2022/001868.
Yoshihiro Yamaji et al., "Weed control efficacy of a novel herbicide, pyroxasulfone", J. Pestic. Sci., vol. 39, Issue 3, pp. 165-169, 2014.
Yoshihiro Yamaji, "Study of Herbicidal Effects and Properties of Novel Herbicidal Pyroxasulfone", Life Sciences and Bioengineering Course, Graduate School of Life and Environmental Sciences, University of Tsukuba, Ph. D. Thesis (Doctor of Philosophy in Agricultural Science), pp. 1-102, 2016, together with partial English translation.
Acknowledgement of Protest to Agent, Common Representative, or Applicant in corresponding Canadian Patent Application No. 3,203,529, issued Nov. 26, 2025.
Filing of Prior Art under S. 34.1 of the Patent Act and/or a Protest under S. 12 of the Patent Rules, dated Jun. 16, 2025 in corresponding Canadian Patent Application No. 3,203,529.
First Third-Party Observations issued Dec. 16, 2024 in corresponding Australian Patent Application No. 2022211738.
Second Third-Party Observations issued Oct. 21, 2025 in corresponding Australian Patent Application No. 2022211738.
Office Action issued Feb. 17, 2026 in corresponding Canadian Patent Application No. 3,203,529, pp. 1-6.
Anna M. Szmigielski et al., "Relationship of soil properties to pyroxasulfone bioactivity in a range of prairie soils", Acta Agriculturae Scandinavica, Section B—Soil & Plant Science, vol. 67, No. 7, pp. 665-669.
Statement of Grounds and Particulars filed Jun. 3, 2026 in corresponding Australian Patent Application No. 2022211738, pp. 1-5.
Statement of Grounds and Particulars of Opposition filed Jun. 4, 2026 in corresponding Australian Patent Application No. 2022211738, pp. 1-11.
"Sakura® 850 WG Product Guide", Bayer CropScience, 2013, pp. 1-8.

(Continued)

*Primary Examiner* — Bruck Kifle
(74) *Attorney, Agent, or Firm* — Wenderoth, Lind & Ponack, L.L.P.

(57) ABSTRACT

A more effective weed control method is provided for a case where soil treatment with pyroxasulfone is carried out. The present invention provides a weed control method in which treatment with columnar crystals of pyroxasulfone is carried out for soil with a composition having a clay content of less than 15% and a sand content of not less than 65%.

6 Claims, No Drawings

(56) References Cited

OTHER PUBLICATIONS

Michael J. Walsh et al., "The Potential for Pyroxasulfone to Selectively Control Resistant and Susceptible Rigid Ryegrass (Lolium rigidum) Biotypes in Australian Grain Crop Production Systems", Weed Technology, 2011, vol. 25, pp. 30-37.

Bayer CropScience Letter, "Sakura® 850 WG Herbicide is NOT registered for use in barley", Dec 11, 2013, pp. 1-2 Mark Congreve et al., "Soil Behaviour of Pre-Emergent Herbicides in Australian Farming Systems", Grains Research and Development Corporation, First Published Nov. 2014, 2019 Update of 2nd Edition, pp. 1-46.

Mark Congreve et al., "Soil Behavior of Pre-Emergent Herbicides in Australian Farming Systems", Grains Research and Development Corporation, First Published Nov. 2014, 2019 Update of 2nd Edition, pp. 1-46.

U.S. Environmental Protection Agency (EPA) Reg. No. 63588-92, issued on Feb. 15, 2012; K-I Chemical U.S.A., Inc., 11 Martine Avenue Suite 970, White Plains, NY 10606; url: https://www3.epa.gov/pesticides/chem_search/ppls/063588-00092-20120215.pdf.†

U.S. Environmental Protection Agency (EPA) Reg. No. 59639-194, dated Sep. 7, 2016; Valent U.S.A Corporation, P.O. Box 8025, Walnut Creek, CA 94596-8025; url: https://www3.epa.gov/pesticides/chem_search/ppls/059639-00194-20160907.pdf.†

U.S. Environmental Protection Agency (EPA) Reg. No. 7969-338, dated May 18, 2017; BASF Corporation, 26 Davis Drive, Research Triangle Park, NC 27709; url: https://www3.epa.gov/pesticides/chem_search/ppls/007969-00338-20170518.pdf.†

† cited by third party

METHOD FOR CONTROLLING WEEDS

TECHNICAL FIELD

The present invention relates to a method of controlling weeds using columnar crystals of pyroxasulfone. More specifically, the present invention relates to a weed control method characterized in that pyroxasulfone crystals in such a form are applied to soil having a particular soil texture, to obtain a high herbicidal effect.

BACKGROUND ART

Pyroxasulfone is a known herbicidal active component (Patent Document 1), and commercially available in a number of countries including Japan. Pyroxasulfone is known to exhibit high herbicidal effect on grass weeds such as barnyard grass (*Echinochloa crus*-galli), southern crabgrass (*Digitaria ciliaris*), green foxtail (*Setaria viridis*), annual bluegrass (*Poa annua*), Johnson grass (*Sorghum halepense*. (L.) Pers.), orange foxtail (*Alopecurus myosuroides*), Italian rye grass (*Lolium multiflorum*), rigid ryegrass (*Lolium rigidum*), common wild oat (*Avena fatua* L.), slough grass (*Beckmannia syzigachne*), and wild oat (*Avena sativa* L.); and amaranthaceous weeds; broadleaf weeds such as curlytop knotweed (*Persicaria lapathifolia*), white goosefoot (*Chenopodium album*), starwort (*Stellaria media* L), velveleaf (*Abutilon theophrasti*), prickly mallow (*Sida spinosa*), bigpod *sesbania* (*Sesbania exaltata*), ragweed (*Ambrosia artemisiifolia* L.), morning glory (*Ipomoea nil* (L.) Roth), stickwilly (*Galium spurium* var. echinospermon), birdeye speedwell (*Veronica persica*), ivy-leaved speedwell (*Veronica hederifolia*), common henbit (*Lamium amplexicaule*), and violet (*Viola manshurica*); and perennial and annual cyperaceous weeds such as coco-grass (*Cyperus rotundus*), yellow nutsedge (*Cyperus esculentus*), spikesedge (*Kyllinga brevifolia* var. leiolepis), Asian flatsedge (*Cyperus microiria*), and rice flat sedge (*Cyperus iria*); and to have a broad herbicidal spectrum (Non-patent Document 1).

In general, soil treatment is a treatment method using a herbicide, winch method is effective in fields. Although soil treatment can be expected to enable pest control for a long period its herbicidal effect varies depending on the environmental conditions after the treatment in the fields. For example, the soil type, and the rainfall after the herbicidal treatment are factors that change the herbicidal effect, and the herbicidal effect may decrease depending on combination of the soil type and the rainfall.

On the other hand, depending on the production method, the crystals of pyroxasulfone obtained exhibit different powder X-ray diffraction spectra representing the characteristics of the columnar form or the needle form. Further, the difference in the crystal form is known to cause differences in the wettability, redispersibility, and the like (Patent Document 2).

However, the difference in the crystal form of pyroxasulfone has not been known to cause a difference in the herbicidal effect.

RELATED ART DOCUMENTS

Patent Documents

[Patent Document 1] WO 02/062770 A1
[Patent Document 2] WO 2021/002484 A2

Non-Patent Document

[Non-Patent Document 1] Yoshihiro Yamaji, Hisashi Honda, Masanori Kobayashi. Ryo Hanai, Jun Inoue. "Weed Control efficacy of a novel herbicide, pyroxasulfone", 2014, Volume 39, Issues 3, Pages 165-169

SUMMARY OF THE INVENTION

Problems to be Solved by the Invention

An object of the present invention is to provide a more effective weed control method for a case where soil treatment with pyroxasulfone is carried out.

Means for Solving the Problems

As a result of intensive study, the present inventor discovered that the object can be achieved by carrying out soil treatment with columnar crystals of pyroxasulfone for a soil having a particular composition, thereby completing the present invention.

Embodiments of the present invention are as follows.

[1] A weed control method characterized by treating soil having a clay content of less than 15% and a sand content of not less than 65% with columnar crystals of pyroxasulfone.

[2] A weed control method characterized by treating soil having a clay content of less than 15% and a sand content of not less than 65% with an agrochemical formulation obtained through a step of pulverizing a powder or slurry containing columnar crystals of pyroxasulfone.

[3] The method according to the above-described 2, wherein the agrochemical formulation is a wettable powder, wettable granule, aqueous suspension, or oily suspension.

[4] The method according to any one of the above-described 1 to 3, wherein the cumulative rainfall during the first 7 days after the treatment of the soil is not less than 15 mm.

Effects of the Invention

By the present invention, a high herbicidal effect can be provided in soil treatment with pyroxasulfone under predetermined conditions.

MODE FOR CARRYING OUT THE INVENTION

The present invention uses pyroxasulfone. This name is an ISO name (common name according to the International Organization for Standardization). Its chemical name is 3-[5-(difluoromethoxy)-1-methyl-3-(trifluoromethyl)pyrazol-4-ylmethylsulfonyl]-4,5-dihydro-5,5-dimethyl-1,2-oxazole.

Two types of forms, needle crystals and columnar crystals, are known as the forms of pyroxasulfone crystals. These forms, together with their production methods, are disclosed in Patent Document 2. Here, the term "columnar" for the crystal form means that, when a rectangle inscribed in the orthographic view of the crystal to be observed is assumed, the ratio of the lengths of the long and short sides of the rectangle is 1:1 to 1:10, preferably 1:1 to 1:5. The term "needle" for the crystal form means that the length of the long side of the rectangle exceeds 10 times the length of the short side. The form of the pyroxasulfone crystals can be observed by means such as optical or electron microscopy, and the method of observation is not particularly limited. The columnar crystals of pyroxasulfone used in the present invention may contain a mixture of needle crystals, but when 10 of them are observed at random, it is preferable that 8 or more crystals have a columnar shape.

The columnar crystals of pyroxasulfone used in the present invention can be obtained by a known method such as a crystallization technique. Examples of the method include the concentration method, poor-solvent addition method, vapor diffusion method (including the sitting-drop method hanging-drop method, and sandwich drop method), batch method (including the oil batch method), dialysis method, liquid-liquid diffusion method (counter diffusion method), cooling method, pressure method, melt-quenching method, thermal cycling method, slurry stirring method, and ultrasonic method. One preferred mode of the method of obtaining the columnar crystals of pyroxasulfone in the present invention is the concentration method, which uses a pyroxasulfone solution containing: a solvent that contains an organic solvent as a major component; and pyroxasulfone as a solute; wherein the organic solvent is evaporated from the pyroxasulfone solution, to precipitate pyroxasulfone. Another preferred mode of the method of obtaining the columnar crystals of pyroxasulfone in the present invention is the poor-solvent addition method, which uses a pyroxasulfone solution containing: a solvent that contains an organic solvent as a major component; and pyroxasulfone as a solute; wherein a poor solvent of pyroxasulfone is added to the pyroxasulfone solution, to precipitate pyroxasulfone.

The term "evaporation" means that part or all of the organic solvent contained in the solvent is removed from the solution by vaporization using volatilization or boiling. By the evaporation of the organic solvent contained in the pyroxasulfone solution, the solution is concentrated to become supersaturated. As a result, the pyroxasulfone that has become excessive with respect to the solvent precipitates as crystals. The evaporation may be carried out under normal pressure, or may be carried out under reduced pressure or increased pressure, when desired. The evaporation may be carried out at room temperature, or may be carried out in a system under heating or cooling, when desired.

The term "poor solvent" means a solvent whose capacity to dissolve a solute is low. In the process of adding the poor solvent to the solvent contained in the pyroxasulfone solution, solubility of pyroxasulfone decreases as the amount of the poor solvent added increases, leading to supersaturation. As a result, the pyroxasulfone that has become excessive with respect to the solvent precipitates as crystals. The addition of the poor solvent may be carried out at room temperature, or may be carried out in a system under heating or cooling, when desired.

In either mode of the method of obtaining the columnar crystals of pyroxasulfone in the present invention, it cannot be said that every organic solvent may be used arbitrarily, and selection of the organic solvent is extremely important. Inappropriate selection of the organic solvent results in failure to obtain columnar crystals of pyroxasulfone having a characteristic pattern found in a desired powder X-ray diffraction spectrum.

In the mode in which the pyroxasulfone in the present invention is precipitated by evaporation of the organic solvent, examples of an organic solvent that may be used include at least the following: aromatic hydrocarbon derivatives (such as benzene, toluene, xylene, chlorobenzene, dichlorobenzene, trichlorobenzene, and nitrobenzene), halogenated aliphatic hydrocarbons (such as dichloromethane and tetrachloroethylene), alcohols (such as methanol, ethanol, isopropanol, butanol, and tert-butanol), nitriles (such as acetonitrile and propionitrile), carboxylic acids (such as formic acid, acetic acid, propionic acid, and butyric acid), carboxylic acid esters (such as methyl acetate, ethyl acetate, propyl acetate, isopropyl acetate, butyl acetate and its isomers, and pentyl acetate and its isomers), ethers (such as tetrahydrofuran, 2-methyltetrahydrofuran, 1,4-dioxane, diisopropyl ether, dibutyl ether, di-tert-butyl ether, cyclopentyl methyl ether, methyl-tert-butyl ether, 1,2-dimethoxyethane, and diglyme), ketones (such as methyl isopropyl ketone and methyl isobutyl ketone), amides (such as N,N-dimethylformamide and N, V-d methylacetamide), ureas (such as N,N'-dimethylimidazolidinone and tetramethylurea), sulfoxides (such as diethylsulfoxide), and sulfones (such as sulfolane); and arbitrary combinations thereof at arbitrary ratios; particularly, nitriles, carboxylic acids, carboxylic acid esters, ketones, amides, and dihalogenated aliphatic hydrocarbons.

Among these, examples of preferred organic solvents include the following: $C_2$-$C_5$ alkane nitrile, $C_1$-$C_4$ carboxylic acids, $C_1$-$C_4$ alkyl $C_1$-$C_4$ carboxylate, $C_1$-$C_4$ alkyl $C_1$-$C_4$ alkyl ketone, N,N-di($C_1$-$C_4$ alkyl) $C_1$-$C_4$ alkanamide, and $C_1$-$C_4$ dihaloalkane; particularly, acetonitrile, acetic acid, ethyl acetate, methyl isobutyl ketone, N,N-dimethylfomamide, N,N dimethylacetamide, and dichloromethane.

In the above mode, the solvent contained in the pyroxasulfone solution may also contain water. Thus, the solvent may be a water-containing solvent. However, from the viewpoint of achieving sufficiently high solubility of pyroxasulfone in the water-containing solvent, the solvent preferably contains an organic solvent as a major component. The term "contain a certain component as a major component" in the present specification means that the content of the component accounts for not less than one-third of the total content of components contained in the composition to be discussed.

Among the solvents described above, examples of preferred solvents include the following: $C_1$-$C_4$ alcohol/$C_2$-$C_5$ alkane nitrile mixed solvents, water-containing $C_2$-$C_5$ alkane nitrite, $C_1$-$C_4$ carboxylic acid, $C_1$-$C_4$ alkyl $C_1$-$C_4$ carboxylate, N,N-di($C_1$-$C_4$ alkyl) $C_1$-$C_4$ alkanamide, and $C_1$-$C_4$ dihaloalkane/$C_1$-$C_4$ alcohol mixed solvents; particularly, acetonitrile/methanol mixed solvents, water-containing acetonitrile, acetic acid, ethyl acetate, methyl isobutyl ketone, N,N-dimethylformamide, N-dimethylacetamide, and dichloromethane % ethanol mixed solvents.

On the other hand, among the above organic solvents, examples of solvents that should not be used individually include the following: chloroform, dimethylsulfoxide, 1,4-dioxane, 2-methyltetrahydrofuran, N-methylpyrrolidone, tetrahydrofuran, trifluoroethanol, and carbon disulfide. However, modes in which these organic solvents are used in combination with other organic solvents, and modes in which water-containing solvents containing these organic solvents and water are used, are not excluded.

In the mode in which a poor solvent is added to precipitate the columnar crystals of pyroxasulfone in the present invention, examples of an organic solvent that may be used include at least the following: aromatic hydrocarbon derivatives (such as benzene, toluene, xylene, chlorobenzene, dichlorobenzene, trichlorobenzene, and nitrobenzene), halogenated aliphatic hydrocarbons (such as dichloromethane and tetrachloroethylene), alcohols (such as methanol, ethanol, isopropanol, butanol, and tert-butanol), nitrites (such as acetonitrile and propionitrile), carboxylic acids (such as formic acid, acetic acid, propionic acid, and butyric acid), carboxylic acid esters (such as methyl acetate, ethyl acetate, propyl acetate, isopropyl acetate, butyl acetate and its isomers, and pentyl acetate and its isomers), ethers (such as tetrahydrofuran, 1,4-dioxane, diisopropyl ether, dibutyl ether, di-tert-butyl ether cyclopentyl methyl ether, methyl-err-butyl ether, 1,2-dimethoxyethane, and diglyme), ketones (such as acetone, methyl ethyl ketone, methyl isopropyl ketone, and methyl isobutyl ketone), amides (such as N,N-dimethylformamide, N,N-dimethylacetamide, and N methylpyrrolidone), ureas (such as N,N'-dimethylimidazolidinone and tetramethylurea), sulfoxides (such as dimethylsulfoxide and diethylsulfoxide), and sulfones (such as sulfolane); and arbitrary combinations thereof at arbitrary ratios; particularly, nitriles, ketones, and carboxylic acid esters.

Among these, examples of preferred organic solvents include the following: $C_2$-$C_5$ alkane nitrile and $C_1$-$C_4$ alkyl $C_1$-$C_4$ carboxylate; particularly, acetonitrile, acetone, and ethyl acetate.

In the above mode, the solvent contained in the pyroxasulfone solution may also contain water. Thus, the solvent may be a water-containing solvent. However, from the viewpoint of achieving sufficiently high solubility of pyroxasulfone in the water-containing solvent, the solvent preferably contains an organic solvent as a major component.

The poor solvent used in the above mode is a solvent in which the solubility of pyroxasulfone at 20° C. is not more than 50 g/L, and examples of the poor solvent include at least the following: ethers (such as diethyl ether, methyl tert-butyl ether, anisole, and 2-methyltetrahydrofuran), carboxylic acid esters (such as isopropyl acetate), ketones (such as methyl isobutyl ketone), aliphatic hydrocarbons (such as cyclohexane and heptane), alcohols (such as methanol, ethanol, propanol, isopropanol, butanol, isobutanol, and tert-butanol), aromatic hydrocarbon derivatives (such as toluene and xylene), and water; particularly, alcohols.

As the poor solvent, a poor solvent compatible with the solvent contained in the pyroxasulfone solution is preferably used. The poor solvent is preferably a $C_1$-$C_4$ alcohol, more preferably ethanol or isopropanol, especially preferably ethanol.

Among combinations of the solvent contained in the pyroxasulfone solution, and the poor solvent, combinations containing the following are especially preferred: acetonitrile and ethanol; acetone and ethanol; or ethyl acetate and ethanol.

In any of the above cases, a seed crystal may be used for obtaining the columnar crystals of pyroxasulfone in the present invention.

In one mode, the pyroxasulfone solution may be the reaction solution used for the reaction for synthesizing pyroxasulfone. The method of synthesizing pyroxasulfone is not particularly limited. The pyroxasulfone may be synthesized according to a known method. The method of synthesizing pyroxasulfone is preferably a method including the step (iii) in Patent Document 2.

In powder X-ray analysis by the transmission method using the Cu-Ku line, the thus obtained columnar crystals of pyroxasulfone preferably show a spectrum having peaks at diffraction angles 2θ at least within the ranges of 17.8 to 17.9°, 18.0 to 18.1°, and 19.9 to 20.0°, and the peak within the range of 19.9 to 20.0° is preferably the highest of the three peaks.

In cases where columnar crystals of pyroxasulfone are used as a herbicidal active component, the crystals may be used alone, but, from the viewpoint of safety, convenience, and the like, the crystals are preferably processed into an agrochemical composition containing an agrochemical adjuvant, that is, into an agrochemical formulation, before use.

The pyroxasulfone columnar crystals used in the present invention may be processed into various forms of agrochemical formulations by known conventional formulation techniques. The present invention also includes such agrochemical formulations (which may be hereinafter referred to as agrochemical formulations of the present invention). The agrochemical formulations of the present invention may be obtained through a step of pulverizing a powder or slurry containing columnar crystals of pyroxasulfone.

Examples of the form of the agrochemical formulation used in the present invention include, but are not limited to, modes of formulations to be sprayed as they are on agricultural land or the like, such as powder formulations and granular formulations; and modes of formulations that are suspensions prepared by suspending in spray water, which suspensions are to be sprayed on agricultural land or the like, such as wettable powders, wettable granules, aqueous suspensions, and oily suspensions.

Preferred examples of the form of the agrochemical formulation include modes of formulations that are suspensions prepared by suspending in spray water, which suspensions are to be sprayed on agricultural land or the like, such as wettable powders, wettable granules, aqueous suspensions, and oily suspensions.

In one mode, more preferred specific examples of the form of the agrochemical formulation include solid formulations such as wettable powders and wettable granules.

Still more preferred specific examples of the solid formulations include wettable powders.

In another mode, more preferred specific examples of the form of the agrochemical formulation include liquid formulations such as aqueous suspensions and oily suspensions.

Still more preferred specific examples of the liquid formulations include aqueous suspensions.

The wettable powders are powdery solid formulations containing an agrochemical active component (in the present invention, columnar crystals of pyroxasulfone) and, as agrochemical adjuvants, a surfactant and a solid carrier. The methods of producing the wettable powders are not limited.

The wettable granules are granular solid formulations containing an agrochemical active component (in the present invention, columnar crystals of pyroxasulfone) and, as agrochemical adjuvants, a surfactant and a solid carrier. The methods of producing the wettable granules are not limited.

The aqueous suspensions are aqueous liquid formulations containing an agrochemical active component (in the present invention, columnar crystals of pyroxasulfone) and, as agrochemical adjuvants, a surfactant and water. The methods of producing the aqueous suspensions are not limited.

The oily suspensions are oily liquid formulations containing an agrochemical active component (in the present invention, columnar crystals of pyroxasulfone) and, as agrochemical adjuvants, a surfactant and an oily dispersion medium. As the oily dispersion medium, a poor solvent of the agrochemical active component is preferably used. The methods of producing the oily suspensions are not limited.

The amount and the ratio of the surfactant included may be appropriately set by those skilled in the an. A single type of surfactant may be used alone, or a combination of two or more types of arbitrary surfactants may be used. Examples of the surfactant include, but are not limited to, nonionic surfactants such as polyoxyalkylene fatty acid esters, polyoxyalkylene sorbitan fatty acid esters, polyoxyalkylene sorbitol fatty acid esters, polyoxyalkylene castor oils, polyoxyalkylene hydrogenated castor oils, polyglycerin fatty acid esters, polyoxyalkylene alkyl ethers, polyoxyalkylene alkyl aryl ethers, polyoxyalkylene aryl phenyl ethers, sorbitan monoalkylates, acetylene alcohols, and acetylene diol, and alkylene oxide adducts thereof; cationic surfactants such as tetraalkylammonium salts, alkylamines, and alkyl pyrimidinium salts; anionic surfactants such as alkyl aryl sulfonic acid salts, such as allylbenzene sulfonates, and condensate thereof dialkyl sulfonic acid salts, dialkyl succinic acid salts, aryl sulfonic acid salts and condensates thereof alkyl sulfuric acid ester salts, alkyl phosphoric acid ester salts, alkyl aryl sulfuric acid ester salts, alkyl aryl phosphoric acid ester salts, lignin sulfonic acid salts, polycarboxylic acid salts, polyoxyalkylene alkyl ether sulfuric acid salts, polyoxyalkylene alkyl ether phosphoric acid salts, polyoxyalkylene aryl ether sulfuric acid salts such as polyoxyethylene distyrylphenyl ether sulfates, polyoxyalkylene aryl ether phosphoric acid salts, polyoxyalkylene alkyl aryl ether sulfuric acid salts, and polyoxyalkylene alkyl aryl ether phosphoric acid salts; amphoteric surfactants such as alkyl betaines, alkylamine oxides, alkyl imidazolinium betaines, amino acids, and lecithins; silicone-based surfactants such as polyether-modified silicones; and fluorine-based surfactants such as perfluoroalkyl sulfonic acid, perfluoroalkyl carboxylic acid, and fluorinated telomer alcohols.

The amount and the ratio of the solid carrier included may be appropriately set by those skilled in the art. A single type of solid carrier may be used alone, or a combination of two or more types of arbitrary solid carriers may be used. Examples of the solid carrier include, but are not limited to, mineral powders such as bentonite, talc, clay, kaolin, diatomaceous earth, amorphous silicon dioxide, calcium carbonate, and magnesium carbonate; organic substances such as saccharides including glucose, sugar, and lactose, carboxymethyl cellulose and salts thereof, starch, dextrin and derivatives thereof microcrystalline cellulose, and urea; and water-soluble inorganic salts such as sodium sulfate, ammonium sulfate, and potassium chloride.

The amount and the ratio of the oily dispersion medium included may be appropriately set by those skilled in the art. A single type of oily dispersion medium may be used alone, or a combination of two or more types of arbitrary oily dispersion media may be used. Examples of the oily dispersion medium include, but are not limited to, animal oils such as whale oil, cod liver oil, musk oil, and mink oil; vegetable oils such as soybean oil, rapeseed oil, maize oil, corn oil sunflower oil, cottonseed oil, linseed oil, coconut oil, palm oil, thistle oil, walnut oil, arachis oil, olive oil, papaya oil, camellia oil, palm oil, sesame oil, rice bran oil, peanut oil, tung oil, sunflower oil, and castor oil, fatty acid esters such as methyl oleate, rapeseed oil methyl esters, and rapeseed oil ethyl esters; and mineral oils such as paraffins, olefins, alkylbenzenes (including toluene, xylene, mesitylene, and ethylbenzene), alkylnaphthalenes (including methylnaphthalene, dimethylnaphthalene, and ethylnaphthalene), kerosene, and phenylxylylethane.

Further, the agrochemical formulation used in the present invention may contain, if desired, agrochemical adjuvants, for example, binders such as starch, alginic acid, glycerin, polyvinylpyrrolidone, polyurethane, polyethylene glycol, polypropylene glycol, polybutene, polyvinyl alcohol, glared gum, liquid paraffin, ethyl cellulose, polyvinyl acetate, and polysaccharide thickeners (including xanthan gum, guru arabic, and guar gum); lubricants such as calcium stearate, talc, and silica, cryoprotectants such as water-soluble substances having relatively low molecular weights (including urea and common salt), and water-soluble polyhydric alcohols (including propylene glycol, ethylene glycol, diethylene glycol, and glycerin); coloring agents such as Brilliant Blue FCF, Cyanine Green G, and Eriogreen G; antiseptics such as sorbic acid, potassium sorbate, parachlorometaxylenol, butyl parahydroxybenzoate, sodium dehydroacetate, 5-chloro-2-methyl-4-isothiazolin-3-one, 2-bromo-2-propane-1,3-diol, and 1,2-benzisothiazolin-3-one; pH adjusting agents such as inorganic acids (including hydrochloric acid, sulfuric acid, and phosphoric acid), organic acids (including citric acid, phthalic acid, and succinic acid), organometallic salts (including sodium citrate and potassium hydrogen phthalate), inorganic metal salts (including disodium hydrogen phosphate, sodium dihydrogen phosphate, dipotassium hydrogen phosphate, potassium dihydrogen phosphate, sodium carbonate, potassium carbonate, and sodium borate), hydroxides (including sodium hydroxide and potassium hydroxide), and organic amines (including triethanolamine); and antifoaming agents such as silicone-based antifoaming agents (including dimethylpolysiloxane and polyphenylsiloxane), fatty acids (including myristic acid), and fatty acid metal salts (including sodium stearate). When an agrochemical formulation of the present invention is a liquid solution, it may contain a thickener, if desired. Examples of the thickener include, but are not limited to, the materials described above as solid carriers and binders. In cases where these agrochemical adjuvants are used for the agrochemical formulation of the present invention, the amounts and the ratios of the adjuvants included may be appropriately set by those skilled in the art.

The agrochemical formulation used in the present invention may contain a toxicity-reducing agent, if desired. In cases where the toxicity-reducing agent is used the amount and the ratio of the agent included may be appropriately set by those skilled in the art. A single type of toxicity-reducing agent may be used alone, or a combination of two or more types of arbitrary toxicity-reducing agents may be used. Examples of the toxicity-reducing agent include, but are not limited to, benoxacor, furilazole, dichlormid, dicyclonone, DKA-24 (N1,N2-diallyl-N2-dichloroacetylglycinamide). AD-67 (4-dichloroacetyl-1-oxa-4-azaspiro [4.5]decane), PPG-1292 (2,2-dichloro-N-(1,3-dioxan-2 ylmethyl)-N-(2-propenyl)acetamide), R-29148 (3-dichloroacetyl-2,2,5-trimethyl-1,3-oxazolidine), cloquintocet-mexyl, naphthalic anhydride (1,8-naphthalic anhydride), mefenpyr-diethyl, mefenpyr, mefenpyr-ethyl, fenchlorazole-ethyl, fenclorim, MG-191 (2-dichloromethyl-2-methyl-1,3-dioxane), cyometrinil, flurazole, fluxofenim, isoxadifen, isoxadifen-ethyl, oxabetrinil, cyprosulfamide, lower-alkyl-substituted benzoic acid, TI-35 (1-dichloroacetylazepane), and N-(2-methoxybenzoyl)-4-[(methylaminocarbonyl)amino]benzenesulfonamide (chemical name, CAS registry number: 129531-12-0).

The agrochemical formulation used in the present invention may contain, if desired, an additional herbicidal active component separately from the columnar crystals of pyroxasulfone. In cases where the additional herbicidal active component is included, the amount and the ratio of the component included may be appropriately set by those skilled in the art. A single type of additional herbicidal active component may be used alone, or a combination of two or more types of arbitrary additional herbicidal active components may be used. Examples of the additional herbicidal active component include, but are not limited to, ioxynil, aclonifen, acrolein, azafenidin, acifluorfen (including its salts with sodium or the like), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, isouron, isoxachlortole, isoxaflutole, isoxaben, isoproturon, ipfencarbazone, imazaquin, imazapic (including its salts with amine or the like), imazapyr (including its salts with isopropylamine or the like), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal-disodium, oxadiazon, oxadiargyl, oxaziclomefone, oxasulfuron, oxyfluorfen, oryzalin, orthosulfamuron, orbencarb, oleic acid, cafenstrole, carfentrazone-ethyl, karbutilate, carbetamide, quizalofop (quizalofop-ethyl), quizalofop-P-ethyl, quizalofop-P-tefuryl, quinoclamine, quinclorac, quinmerac, cumyluron, clacyfos, glyphosate (including its salts with sodium, potassium, ammonium, amine, propylamine, isopropylamine, dimethylamine, trimesium, or the like), glufosinate (including its salts with amine, sodium, or the like), glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbronuron, chloroxuron, chlorotoluron, ketospiradox (including its salts with sodium, calcium, ammonium, or the like), saflufenacil, sarmentine, cyanazine, cyanamide, diuron, diethatyl-ethyl, dicamba (including its salts with amine, diethylamine, isopropylamine, diglycolamine, sodium, lithium, or the like), cycloate, cycloxydim, diclosulam, cyclosulfamuron, cyclopyranil, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoseb, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sulfosate, sulfosulfuron, sulfometuron-methyl, sethoxydim, terbacil, daimuron, thaxtomin A, dalapon, thiazopyr, tiafenacil, thiencarbazone (including its sodium salt, methyl ester, and the like), tiocarbazil, thiobencarb, thidiazimin, thifensulfuron-methyl, desmedipham, desmetryne, tetflupyrolimet, thenylchlor, tebutam, tebuthiuron, tepraloxydim, tefuryltrione, tembotrione, terbuthylazine, terbutryn, terbumeton, topramezone, tralkoxydim, triaziflam, triasulfuron triafamone, tri-allate, trietazine, triclopyr, triclopyr-butotyl, trifludimoxazin, tritosulfuron, triflusulfuron-methyl, trifluralin, trifloxysulfuron-sodium, tribenuron-methyl, tolpyralate, naptalam (including its salts with sodium or the like), naproanilide, napropamide, napropamide-M, nicosulfuron, neburon, norflurazon, vemolate, paraquat, halauxifen-benzyl, halauxifen-methyl, haloxyfop, haloxyfop-P, haloxyfop-etotyl, halosafen, halosulfuron-methyl, bixlozone, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxsulam, phenisopham, fenuron, fenoxasulfone, fenoxaprop (including its methyl, ethyl, and isopropyl esters), fenoxaprop-P (including its methyl, ethyl, and isopropyl esters), fenquinotrione, fenthiaprop-ethyl, fentrazamide, phenmedipham, butachlor, butafenacil, butamifos, butylate, butenachlor, butralin, butroxydim, flazasulfuron, flamprop (including its methyl, ethyl, and isopropyl esters), flamprop-M (including its methyl, ethyl, and isopropyl esters), primisulfuron-methyl fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl-sodium, flufenacet, flufenpyr-ethyl, flupropanate, flupoxame, flumioxazin, flumiclorac-pentyl, flumetsulam, fluridone, flurtamone, fluroxypyr, flurochloridone, pretilachlor, procarbazone-sodium, prodiamine, prosulfuron, prosulfocarb, propaquizafop, propachlor, propazine, propanil, propyzamide, propisochlor, propyrisulfuron, propham, profluazol, propoxycarbazone-sodium, profoxydim, bromacil, brompyrazon, prometryn, prometon, bromoxynil (including its esters with butyric acid, octanoic acid, heptanoic acid, or the like), bromofenoxim, bromobutide, florasulam, florpyrauxifen, hexazinone, pethoxamid, benazolin, penoxsulam, heptamaloxyloglucan, beflubutamid, beflubutamid-M, pebulate, pelargonic-acid, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, foramsulfuron, mecoprop (including its salts with sodium, potassium, isopropylamine, triethanolamine, dimethylamine, or the like), mecoprop-P-potassium, mesosulfuron-methyl, mesotrione, metazachlor, metazosulfuron, methabenzthiazuron, metamitron, metamifop, DSMA (disodium methanearsonate), methiozolin, methyldymuron, metoxuron, metosulam, metsulfuron-methyl, metobromuron, metobenzuron, metolachlor, metribuzin, mefenacet, monosulfiron (including its methyl, ethyl, and isopropyl esters), monolinuron, molinate, iodosulfuron, iodosulfuron-methyl-sodium, iofensulfuron, iofensulfuron-sodium, lactofen, lancotrione, linuron, rimsulfuron, lenacil, TCA (2,2,2-trichloroacetic acid) (including its salts with sodium, calcium, ammonia, or the like), 2,3,6-TBA (2,3,6-trichlorobenzoic acid), 2,4,5-T (2,4,5-trichlorophenoxyacetic acid), 2,4-D (2,4-dichlorophenoxyacetic acid) (including its salts with amine, diethylamine, triethanolamine, isopropylamine, sodium, lithium, or the like), ACN (2-amino-3-chloro-1,4-naphthoquinone), MCPA (2-methyl-4-chlorophenoxyacetic acid). MCPB (2-methyl-4-chlorophenoxybutyric acid) (including its sodium salt, ethyl ester, and the like), 2,4-DB (4-(2,4-dichlorophenoxy)butyric acid), DNOC (4,6-dinitro-O-cresol) (including its salts with amine, sodium, or the like), AE-F-150944 (code number), HW-02 (code number), IR-6396 (code number), MCPA-thioethyl, SYP-298 (code number), SYP-300 (code number), EPTC (S-ethyldipropylthiocarbamate), S-metolachlor, S-9750 (code number), and MSMA.

The agrochemical formulation used in the present invention may contain, if desired, a pest control active component in addition to the columnar crystals of pyroxasulfone. In cases where the pest control active component is included, the amount and the ratio of the component included may be appropriately set by those skilled in the art. A single type of pest control active component may be used alone, or a combination of two or more types of arbitrary pest control active components may be used. Examples of the pest control active component include, but are not limited to, acrinathrin, azadirachtin, azamethiphos, azinphos-ethyl, azinphos-methyl, acequinocyl, acetamiprid, acetoprole, acephate, azocyclotin, abamectin, afidopyropen, afoxolaner, amidoflumet, amitraz, alanycarb, aldicarb, aldoxycarb, allethrin [including its d-cis-trans-isomer and d-trans-isomer], isazophos, isamidofos, isocarbophos, isoxathion, isocycloseram, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectin benzoate, endosulfan, empenthrin, oxazosulfyl, oxamyl, oxydemeton-methyl, oxydeprofos, omethoate, cadusafos, kappa-tefluthrin, kappa-bifenthrin, kadethrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, chloroprallethrin, cyanophos, diafenthiuron, diamidafos, cyantraniliprole, dienochlor, cyenopyrafen, dioxabenzofos, diofenolan, cyclaniliprole, dicrotophos, dichlofenthion, cycloprothrin, dichlorvos, dicloromezotiaz, 1,3-dichloropropene, dicofol, dicyclanil, disulfoton, dinotefiran, dinobuton, cyhalodiamide, cyhalothrin [including its gamma-isomer and lambda-isomer], cyphenothrin [including its IR-trans-isomer], cyfluthrin [including its beta-isomer], diflubenzuron, cyflumetofen, diflovidazin, cyhexatin, cypermethrin [including its alpha-isomer, beta-isomer, theta-isomer, and zeta-isomer], dimpropyridaz, dimethylvinphos, dimefluthrin, dimethoate, silafluofen, cyromazine, spinetoram, spinosad, spirodiclofen, spirotetramat, spiropidion, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tyclopyrazoflor, tetrachlorantraniliprole, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, *Verticillium lecanii*, hydroprene. *Pasteuria penetrans* spores, vamidothion, parathion, parathion-methyl, halfenprox, halofenozide, bioallethrin, bioallethrin S-cyclopentenyl, bioresmethrin, bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including its 1R-trans-isomer], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazaindolizine, fluazuron, fluensulfone, sodium fluoroacetate, fluxametamide, flucycloxuron, flucythrinate, flusulfamide, fluvalinate [including its tau-isomer], flupyradifurone, flupyrazofos, flupyrimin, flufiprole, flufenerim, flufenoxystrobin, flufenoxuron, fluhexafon, flubendiamide, flumethrin, fluralaner, prothiofos, protrifenbute, flonicamid, propaphos, propargite, profenofos, broflanilide, brofluthrinate, profluthrin, propetamphos, propoxur, flometoquin, bromopropylate, hexythiazox, hexaflumuron, *Paecilomyces tenuipes, Paecilomyces fumosoroseus*, heptafluthrin, heptenophos, permethrin, benclothiaz, benzpyrimoxan, bensultap, benzoximate, bendiocarb, benfuracarb, *Beauveria tenella, Beauveria bassiana, Beauveria brongniartii*, phoxim, phosalone, fosthiazate, fosthietan, phosphamidon, phosmet, polynactins, formetanate, phorate, malathion, milbemectin, mecarbam, mesulfenfos, methoprene, methomyl, metaflumizone, methamidophos, metham, methiocarb, methidathion, methyl isothiocyanate, methyl bromide, methoxychlor, methoxyfenozide, methothrin, metofluthrin, epsilon-metofluthrin, metolcarb, mevinphos, meperfluthrin, *Monacrosporium phymatophagum*, monocrotophos, momfluorothrin, epsilon-momfluorothrin, litlure-A, litlure-B, aluminium phosphide, zinc phosphide, phosphine, lufenuron, rescalure, resmethrin, lepimectin, rotenone, fenbutatin oxide, calcium cyanide, nicotinesulfate, (Z)-11-tetradecenyl=acetate, (Z)-11-hexadecenal, (Z) 11-hexadecenyl=acetate, (Z)-9,12-tetradecadienyl=acetate, (Z)-9-tetradecen-1-ol, (Z,E)-9,11-tetradecadienyl=acetate, (Z,E)-9,12-tetradecadienyl=acetate, *Bacillus popilliae, Bacillus subtillis, Bacillus sphaericus, Bacillus thuringiensis* subsp. *aizawai, Bacillus thuringiensis* subsp. *israelensis, Bacillus thuringiensis* subsp. *kurstaki, Bacillus thuringiensis* subsp. *tenebrionis*, Bt proteins (Cry1Ab, Cry1Ac, Cry1Fa, Cry2Ab, mCry3A, Cry3Ab, Cry3Bb, and Cry34/35Ab1), CL900167 (code number), DCIP (bis-(2-chloro-1-methylethyl)ether), DDT (1,1,1-trichloro-2,2-bis(4-chlorophenyl) ethane), DEP (dimethyl-2,2,2-trichloro-1-hydroxyethylphosphonate), DNOC (4,6-dinitro-o-cresol), DSP (O,O-diethyl-O-[4-(dimethylsulfamoyl)phenyl]-phosphorothioate), EPN (O-ethyl-O-4-(nitrophenyl) phenylphosphonothioate), nuclear polyhedrosis vines inclusion body, NA-85 (Code No.), NA-89 (Code No.), NC-515 (code number), RU15525 (code number), XMC, Z-13-icosen-10-one, ZXI8901 (code number), 2-chloro-4-fluoro-5-[(5-trifluoromethylthio)pentyloxy]phenyl 2,2,2-trifluoroethyl sulfoxide (chemical name, CAS registry number: 1472050-04-6), 2,4-dichloro-5-{2-[4-(trifluoromethyl)phenyl]ethoxy}phenyl 2,2,2-trifluoroethyl sulfoxide (chemical name, CAS registry number: 1472052-11-1), 2,4-dimethyl-5-[6-(6-(trifluoromethylthio)hexyloxy]phenyl-2,2,2-trifluoroethyl sulfoxide (chemical name, CAS registry number: 1472050-34-2), 2-{2-fluoro-4-methyl-5-[(2,2,2-trifluoroethyl)sulfinyl]phenoxy}-5-(trifluoromethyl)pyridine (chemical name, CAS registry number: 1448758-62-0), 3-chloro-2-{2-fluoro-4-methyl-5-[(2,2,2-trifluoroethyl) sulfinyl]phenoxy}-5-(trifluoromethyl)pyridine (chemical name, CAS registry number: 1448761-28-1), 4-fluoro-2-methyl-5-(5,5-dimethylhexyloxy)phenyl 2,2,2-trifluoroethyl sulfoxide (chemical name, CAS registry number: 1472047-71-4), and NI-30 (code number).

The agrochemical formulation used in the present invention may contain, if desired, a disease control active component in addition to the columnar crystals of pyroxasulfone. In cases where the disease control active component is included, the amount and the ratio of the component included may be appropriately set by those skilled in the art. A single type of disease control active component may be used alone, or a combination of two or more types of arbitrary disease control active components may be used. Examples of the disease control active component include, but are not limited to, azaconazole, acibenzolar-S-methyl, azoxystrobin, anilazine, amisulbrom, aminopyrifen, ametoctradin, aldimorph, isotianil, isopyrazam, isofetamid, isoflucypram, isoprothiolane, ipconazole, ipflufenoquin, ipfentrifluconazole, iprodione, iprovalicarb, iprobenfos, imazalil, iminoctadine-trialbesilate, iminoctadine-triacetate, imibenconazole, inpyrfluxam, imprimatin A, imprimatin B, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxine-copper, oxytetracycline, oxpoconazole-fumarate, oxolinic acid, copper dioctanoate, octhilinone, ofurace, orysastrobin, o-phenylphenol, kasugamycin, captafol, carpropamid, carbendazim, carboxin, canon, quinoxyfen, quinofumelin, chinomethionat, captan, quinconazole, quintozene, guazatine, cufraneb, coumoxystrobin, kresoxim-methyl, clozylacon, chlozolinate, chlorothalonil, chloroneb, cyazofamid, diethofencarb, diclocymet, dichlorfluanid, dichlobenthiazox, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thifluzamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanide, tolclofos-methyl, tolnifanide, tolprocarb, nabam, natamycin, naftifine, nitrapyrin, nitrothal-isopropyl, nuarimol, copper nonyl phenol sulphonate. *Bacillus subtilis* (strain: QST 713), validamycin, valifenalate, picarbutrazox, bixafen, picoxystrobin, pydiflumetofen, bitertanol, binapacryl, biphenyl, piperalin, hymexazol, pyraoxystrobin, pyraclostrobin, pyraziflumid, pyrazophos, pyrapropoyne, pyrametostrobin, pyriofenone, pyrisoxazole, pyridachlometyl, pyrifenox, pyributicarb, pyribencarb, pyrimethanil, pyroquilon, vinclozolin, ferbam, famoxadone, phenazine oxide, fenamidone, fenaminstrobin, fenarimol, fenoxanil, ferimzone, fenpiclonil, fenpicoxamid, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluindapyr, fluoxastrobin, fluoxapiprolin, fluopicolide, fluopimomide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, flometoquin, florylpicoxamid, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (aluminium, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metyltetraprole, metconazole, metominostrobin, metrafenone, mepanipyrim, mefentrifluconazole, meptyldinocap, mepronil, iodocarb, laminarin, phosphorous acid and salts, copper oxychloride, silver, cuprous oxide, copper hydroxide, potassium bicarbonate, sodium bicarbonate, sulfur, oxyquinoline sulfate, copper sulfate, (3,4-dichloroisothiazol-5-yl)methyl 4-(tert-butyl)benzoate (chemical name, CAS registry number: 1231214-23-5), BAF-045 (code number), BAG-010 (code number). UK-2A (code number), DBEDC (dodecylbenzenesulfonic acid bisethylenediamine copper complex salt), MIF-1002 (code number), NF-180 (code number), TPTA (triphenyltin acetate), TPTC (triphenyltin chloride), TPTH (triphenyltin hydroxide), and nonpathogenic *Erwinia carotovora.*

The agrochemical formulation used in the present invention may contain, if desired, a plant growth-regulating active component in addition to the columnar crystals of pyroxasulfone. In cases where the plant growth-regulating active component is included, the amount and the ratio of the component included may be appropriately set by those skilled in the art. A single type of plant growth-regulating active component may be used alone, or a combination of two or more types of arbitrary plant growth-regulating active components may be used. Examples of the plant growth-regulating active component include, but are not limited to, 1-methylcyclopropene, 1-naphthylacetamide, 2,6-diisopropylnaphthalene, 4-CPA (4-chlorophenoxyacetic acid), benzylaminopurine, ancymidol, aviglycine, carvone, chlormequat, cloprop, cloxyfonac, cloxyfonac-potassium, cyclanilide, cytokinins, daminozide, dikegulac, dimethipin, ethephon, epocholeone, ethychlozate, flumetralin, fluorenol, flurprimidol, pronitridine, forchlorfenuron, gibberellins, inabenfide, indole acetic acid, indole butyric acid, maleic hydrazide, mefluidide, mepiquat chloride, n-decanol, paclobutrazol, prohexadione-calcium, prohydrojasmon, sintofen, thidiazuron, triacontanol, trinexapac-ethyl, uniconazole, uniconazole-P, 4-oxo-4-(2-phenylethyl) aminobutyric acid (chemical name, CAS registry number: 1083-55-2), and calcium peroxide.

A preferred mode of the agrochemical formulation of the present invention when the form is a wettable powder includes columnar crystals of pyroxasulfone at 10 to 90 wt %, a surfactant at 5 to 20 wt %, and a solid carrier at 5 to 85% in the agrochemical formulation. Further, the formulation optionally includes an additional herbicidal active component at 0 to 80%, a binder at 0 to 5 wt %, a coloring agent at 0 to 1 wt %, an antifoaming agent at 0 to 1 wt %, and a toxicity-reducing agent at 0 to 80 wt %.

One mode of the production of the wettable powder includes the steps of: pulverizing a powder containing columnar crystals of pyroxasulfone; and mixing the whole raw material for homogenization. Agrochemical adjuvants may be added in part or in whole during the above pulverizing step, or a part or whole of them, for example, surfactant may be added after the pulverizing step. A specific method of producing the wettable powder includes, for example, a method comprising a step of pulverizing a powder containing columnar crystals of pyroxasulfone and a step of mixing the whole raw material, including the pulverized columnar crystals of pyroxasulfone, surfactant, and solid carrier, for homogenization. In either step, known conventional techniques and apparatuses may be used.

A preferred mode of the agrochemical formulation when the form is a wettable granule includes columnar crystals of pyroxasulfone at 10 to 90 wt %, a surfactant at 5 to 20 wt %, and a solid carrier at 5 to 85% in the agrochemical formulation. Further, the formulation optionally includes an additional herbicidal active component at 0 to 80 wt %, a binder at 0 to 5 wt %, a coloring agent at 0 to 1 wt %, an antifoaming agent at 0 to 1 wt %, and a toxicity-reducing agent at 0 to 80 wt %.

One mode of the production of the wettable granule includes the steps of: pulverizing a powder or slurry containing columnar crystals of pyroxasulfone; kneading the whole raw material for homogenization while adding a certain amount of water thereto; granulating the kneaded product obtained in the previous step; and drying the granulated product obtained in the previous step. Agrochemical adjuvants may be added in part or in whole during the above pulverizing step or after the pulverizing step. In the case of slurry addition, for example, at least part of the surfactant can be included in the slimy. A specific method for producing the wettable granule includes, for example, a method comprising a step of pulverizing a powder or shiny containing columnar crystals of pyroxasulfone, a step of kneading the whole raw material containing the pulverized columnar crystals of pyroxasulfone, surfactant, and solid carrier for homogenization while adding a certain amount of water thereto, a step of granulating the kneaded product obtained in the previous step, and a step of drying the granulated product obtained in the previous step. In any of the steps, known conventional techniques and apparatuses may be used.

A preferred mode of the agrochemical formulation when the form is an aqueous suspension includes columnar crystals of pyroxasulfone at 5 to 65 wt %, a surfactant at 5 to 10 wt %, and water at 30 to 90 wt % in the agrochemical formulation. Further, the formulation optionally includes an additional herbicidal active component at 0 to 50 wt %, a cryoprotectant at 0 to 15 wt %, a coloring agent at 0 to 1 wt %, an antiseptic at 0 to 3 wt %, a pH adjusting agent at 0 to 5 wt %, an antifoaming agent at 0 to 1 wt %, a thickener at 0 to 5 wt %, and a toxicity-reducing agent at 0 to 50 wt %. Further, the formulation may include an oily dispersion medium at 0 to 20 wt % for the purpose of improvement of the pharmacological effect, adjustment of the specific gravity, and/or the like.

One mode of the production of the aqueous suspension includes the steps of: pulverizing a slurry containing columnar crystals of pyroxasulfone; and mixing the whole raw material for homogenization. Another mode includes the steps of: pulverizing a powder containing columnar crystals of pyroxasulfone; and mixing the whole raw material for homogenization. Agrochemical adjuvants may be added in part or in whole during the above pulverizing step or after the pulverizing step. It is preferred in the case of slurry addition that, for example, the slurry is prepared by adding at least part of the water along with at least part of the surfactant in advance. A specific method for producing the aqueous suspension includes, for example, a method comprising a step of pulverizing a slurry or powder containing columnar crystals of pyroxasulfone, and a step of mixing the whole raw material, containing the pulverized columnar crystals of pyroxasulfone, surfactant, and water, for homogenization. In either step, known conventional techniques and apparatuses may be used.

A preferred mode of the agrochemical formulation when the form is an oily suspension includes columnar crystals of pyroxasulfone at 5 to 65 wt %, a surfactant at 5 to 10 wt %, and an oily dispersion mediums at 30 to 90 wt % in the agrochemical formulation. Further, the formulation optionally includes an additional herbicidal active component at 0 to 50 wt %, a cryoprotectant at 0 to 15 wt %, a coloring agent at 0 to 1 wt %, an antiseptic at 0 to 3 wt %, a pH adjusting agent at 0 to 5 wt %, an antifoaming agent at 0 to 1 wt %, a thickener at 0 to 5 wt %, and a toxicity-reducing agent at 0 to 50 wt %.

One mode of the production of the oily suspension includes the steps of: pulverizing a slurry containing columnar crystals of pyroxasulfone; and mixing the whole raw material for homogenization. Another mode includes the steps of: pulverizing a powder containing columnar crystals of pyroxasulfone; and mixing the whole raw material for homogenization. Agrochemical adjuvants may be added in part or in whole during the above pulverizing step or after the pulverizing step. However, it is preferred in the case of slurry addition that the slum is prepared by adding at least part of the oily suspension medium along with at least part of surfactant in advance. A specific method for producing the oily suspension includes, for example, a method comprising a step of pulverizing a slurry or powder containing columnar crystals of pyroxasulfone, and a step of mixing the whole raw material, containing the pulverized columnar crystals of pyroxasulfone, surfactant, and oily suspension medium for homogenization. In either step, known conventional techniques and apparatuses may be used.

It is important for the weed control method of the present invention to include a soil treatment step of carrying out soil treatment using the columnar crystals of pyroxasulfone of the present invention described above. The columnar crystals of pyroxasulfone may be ground products. The columnar crystals of pyroxasulfone may also be processed into the agrochemical formulations as described above. The soil treatment step is preferably carried out by spraying the columnar crystals of pyroxasulfone of the present invention before emergence of the weed to be controlled. The weed control method of the present invention can be applied to either non-agricultural or agricultural land, but it is preferred to be applied to agricultural land, especially field. The method of spraying on the soil is not limited, and the spraying may be carried out in accordance with an ordinary conventional method depending on the form of the agrochemical formulation.

In the soil to be treated by the method of the present invention, the clay content is less than 15%, and the sand content is not less than 65%. In the soil, the silt content is not more than 35%, preferably not more than 20%. Such clay content, silt content, and sand content can be measured, for example, by the laser diffraction method or the like. Examples of such soil include sand, loamy sand and sandy loam. The above soils are based on soil texture classification according to the International Union of Soil Sciences.

The soil to be treated by the method of the present invention preferably tends to be wet. More specifically, the cumulative rainfall in the soil during the first 7 days after the treatment of the soil with the columnar crystals of pyroxasulfone is preferably not less than 15 mm, more preferably not less than 30 min, especially preferably not less than 45 mm.

In the weed control method of the present invention, the cultivated crop is not limited and is preferably a crop that can be cultivated in a field. The method is suitable for cultivation conditions for crops such as maize, rice, wheat, durum wheat, barley, rye, triticale, spelt, club wheat, oat, sorghum, cotton, soybean, alfalfa, peanut, common beam lima bean, adzuki bean, cowpea, mung bean, black gram, runner bean, rice bean, moth bean, tepary bean, broad bean, pea, chickpea, lentil, lupin, pigeon pea, buckwheat, sugar beet, rapeseed, canola, sunflower, sugarcane, cassava, Chinese yarn, oil palm, *Jatropha curcas*, hemp, flax, quinoa, safflower, tea plant, mulberry, and tobacco.

The variety of the cultivated crop in the weed control method of the present invention is not limited, and includes plants to which resistance against a 4-hydroxyphenylpyruvate dioxygenase (4-HPPD) inhibitor such as isoxaflutole, sulcotrione, mesotrione, and pyrazolinate, against an acetolactate synthase (ALS) inhibitor such as imazethapyr, imazamox, thiencarbazone, thifensulfuron-methyl, or tribenuron, against a 5-enolpyruvylshikimate-3-phosphate (EPSP) synthase inhibitor such as glyphosate, against a glutamine synthetase inhibitor such as glufosinate, against an acetyl-CoA carboxylase (ACCase) inhibitor such as sethoxydim or quizalofop, against a protoporphyrinogen oxidase (PPO) inhibitor such as flumioxazin or epyrifenacil, against a photosystem II inhibitor such as bromoxynil, and/or against a herbicide such as dicamba or 2,4-D, was given by the classical breeding method and/or the genetic recombination technique.

Examples of the crops to which the resistance was given by the classical breeding method include rapeseed, wheat, sunflower, rice, and maize resistant to imidazolinone-based ALS-inhibiting herbicides such as imazethapyr. Those plants are already commercially available under the trade name Clearfield <registered trademarks>.

Similarly, soybean resistant to sulfonylurea-based ALS-inhibiting herbicides such as thifensulfuron-methyl has been produced by the classical breeding method, and is already commercially available under the trade name STS Soybean. Similarly, sorghum resistant to sulfonylurea-based acetolactate synthase (ALS)-inhibiting herbicides has been produced by the classical breeding method, and is already commercially available. Similarly, sugar beet resistant to thiencarbazone, and resistant to acetolactate synthase (ALS)-inhibiting herbicides, has been produced by the classical breeding method, and is already commercially available. Similarly, there are useful plants to which resistance to acetyl-CoA carboxylase (ACCase) inhibitors such as trione oxime-based or aryloxyphenoxypropionate-based herbicides has been given by the classical breeding method, and examples of such plants include SR maize (also known as "PoastProtected <registered trademark> corn") and quizalofop-resistant wheat. Plants to which resistance to acetyl-CoA carboxylase (ACCase) inhibitors has been given are described in, for example, "Proceedings of the National Academy of Science of the United States of America", vol. 87, pp. 7175-7179 (1990). Further, mutant acetyl-CoA carboxylase (ACCase) resistant to acetyl-CoA carboxylase (ACCase) inhibitors has been reported in, for example, "Weed Science" vol. 53, pp. 728-746(2005). By introducing such a mutant acetyl-CoA carboxylase gene to a plant by the genetic recombination technique, or by introducing a mutation involved in the resistance acquisition to the crop acetyl-CoA carboxylase (ACCase), a plant resistant to acetyl-CoA carboxylase inhibitors can be prepared. Further, a plant resistant to acetyl-CoA carboxylase (ACCase) inhibitors/herbicides can be prepared by introducing a base substitution mutation-introduced nucleic acid to a plant cell by a technique represented by the chimeraplasty technique according to "Repairing the Genome's Spelling Mistakes" ("Science", vol. 285, pp. 316-318 (1999, Gura T.)) to cause site-directed amino acid substitution mutation in the crop (acetyl-CoA carboxylase (ACCase)/herbicide target) gene.

Examples of the useful plants to which the resistance was given by the genetic recombination technique include glyphosate-resistant maize, soybean, cotton, rapeseed, sugar beet, and alfalfa varieties that are already commercially available under trade names such as Roundup Ready <registered trademark>, Roundup Ready 2<registered trademark>, and AgrisureGT <registered trademark>. Similarly, glufosinate-resistant maize, soybean, cotton, and rapeseed varieties have been produced by the genetic recombination technique, and are already commercially available under trade names such as LibertyLink <registered trademark>. Similarly, bromoxynil-resistant cotton has been produced by the genetic recombination technique, and is already commercially available under the trade name BXN. Similarly, soybean resistant to HPPD inhibitors has been produced by the genetic recombination technique, and is already commercially available as a variety resistant to mesotrione and glufosinate, under the trade name Herbicide-tolerant Soybean line, and as a variety resistant to HPPD inhibitors, glyphosate, and glufosinate, under trade names such as Credenz <registered trademark>. Similarly, maize, soybean, and cotton resistant to 2,4-D or ACCase inhibitors have been produced by the genetic recombination technique, and are already commercially available under trade names such as Enlist <registered trademark>. Similarly, soybean resistant to dicamba has been produced by the genetic recombination technique, and is already commercially available as a variety resistant to dicamba and glyphosate, under trade names such as Roundup Ready 2 Xtend <registered trademark>. Similarly, a soybean variety resistant to HPPD inhibitors such as isoxaflutole due to HPPD inhibitor resistance given by the genetic recombination technique, which variety is also resistant to nematodes, has already acquired registration as GMB 151 in the United States.

Further plants with modified resistance to herbicides are widely known, and examples of such plants include: alfalfa, apple, barley, eucalyptus, flax, grape, lentil, rapeseed pea, potato, rice, sugar beet, sunflower, tobacco, tomato, turf grass, and wheat resistant to glyphosate (see, for example, U.S. Pat. Nos. 5,188,642, 4,940,835, 5,633,435, 5,804,425, and 5,627,061); beans, cotton, soybean, pea, potato, sunflower, tomato, tobacco, maize, sorghum, and sugar cane resistant to dicamba (see, for example, WO 2008/051633, U.S. Pat. Nos. 7,105,724, and 5,670,454); soybean, sugar beet, potato, tomato, and tobacco resistant to glufosinate (see, for example, U.S. Pat. Nos. 6,376,754, 5,646,024, and 5,561,236); cotton, peppers, apple, tomato, sunflower, tobacco, potato, maize, cucumber, wheat, soybean, sorghum, and cereals resistant to 2,4-D (see, for example, U.S. Pat. Nos. 6,153,401, 6,100,446, WO 2005/107437, U.S. Pat. Nos. 5,608,147, and 5,670,454); canola, maize, Japanese millet, barley, cotton, leaf mustard, lettuce, lentil, melon, foxtail millet, oat, rapeseed, potato, rice, rye, sorghum, soybean, sugar beet, sunflower, tobacco, tomato, and wheat resistant to ALS-inhibiting herbicides (such as sulfonylurea-based herbicides and imidazolinone-based herbicides) (see, for example, U.S. Pat. No. 5,013,659, WO 2006/060634, U.S. Pat. Nos. 4,761,373, 5,304,732, 6,211,438, 6,211,439, and 6,222,100), especially rice resistant to imidazolinone-based herbicides, which rice has particular mutations (such as S653N, S654K, A122T, S653(At)N, S654(At)K, and A122(At)T) in the acetolactate synthase gene (see, for example, US 2003/0217381 A and WO 2005/020673); barley, sugar cane, rice, maize, tobacco, soybean, cotton, rapeseed, sugar beet, wheat, and potato resistant to HPPD-inhibiting herbicides (such as isoxazole-based herbicides including isoxaflutole; triketone-based herbicides including sulcotrione and mesotrione; and pyrazole-based herbicides including pyrazolynate) or diketonitrile, which is a degradation product of isoxaflutole (see, for example, WO 2004/055191. WO 1996/038567, WO 1997/049816, and U.S. Pat. No. 6,791,014); and wheat, soybean, cotton, sugar beet, rapeseed, rice, maize, sorghum, sugar cane, and sugar beet resistant to PPO-inhibiting herbicides (see, for example, US 2002/0073443 A. US 2008/0052798 A. and "Pest Management Science" vol. 61, pp. 277-285 (2005)).

Examples of plants to which herbicide resistance was given by the conventional breeding technique or the genome breeding technology include: the rice "Clearfield <registered trademark> Rice", the wheat "Clearfield <registered trademark> Wheat", the sunflower "Clearfield <registered trademark> Sunflower", the lentil Clearfield <registered trademark> lentils", and the canola "Clearfield <registered trademarks canola", which are resistant to imidazolinone-based ALS-inhibiting herbicides such as imazethapyr and imazamox; the soybean "STS soybean", which is resistant to sulfonylurea-based ALS-inhibiting herbicides such as thifensulfuron-methyl; the maize "SR coin", which is resistant to acetyl-CoA carboxylase inhibitors such as trione oxime-based herbicides and aryloxyphenoxypropionate-based herbicides; the sunflower "ExpressSun <registered trademark>", which is resistant to sulfonylurea-based herbicides such as tribenuron; the rice "Provisia <registered trademark> Rice", which is resistant to acetyl-CoA carboxylase inhibitors such as quizalofop; the canola "Triazine Tolerant Canola", which is resistant to photosystem II inhibitors; and the sorghum "Igrowth <registered trademarks>", which is resistant to imidazolinone-based herbicides.

Examples of plants to which herbicide resistance was given by the genome editing technology include the canola "SU Canola <registered trademark>", which is resistant to sulfonylurea-based herbicides, produced using the Rapid Trait Development System (RTDS) <registered trademark>. The genome editing technology is a technology in which genetic information is sequence-specifically converted, and this technology enables deletion of base sequences, substitution of amino acid sequences, introduction of foreign genes, and the like. The RTDS <registered trademark> corresponds to oligonucleotide-directed mutagenesis in the genome editing technology. It is a technique capable of introducing a mutation through a Gene Repair OligoNucleotide (GRON), that is, a DNA-RNA chimeric oligonucleotide, without cleaving the DNA in the plant. Other examples of the plants include: maize whose herbicide resistance and phytic acid content were reduced by deletion of the endogenous gene IPK1 using zinc-finger nuclease (see, for example, "Nature", vol. 459, pp. 437-441 (2009)); and rice to which herbicide resistance was given using CRISPR-Cas9 (see, for example, "Rice", vol. 7, p. 5 (2014)).

Examples of plants to which herbicide resistance was given by new plant breeding techniques include soybean in which properties of a GM rootstock were given to a scion using a breeding technique utilizing grafting. Specific examples of the soybean include soybean in which glyphosate resistance was given to a non-transgenic soybean scion using, as a rootstock, Roundup Ready <registered trademark> soy, winch has glyphosate resistance (see "Weed Technology", vol. 27, p. 412 (2013).

The "useful plants" described above also include plants modified to have a capacity to synthesize, for example, a selective toxin known in the genus *Bacillus*, by using the genetic recombination technique.

Examples of insecticidal toxins expressed in such recombinant plants include: insecticidal proteins derived from *Bacillus cereus* or *Bacillus popilliae*; δ-endotoxin protein such as Cry1Ab, Cry1Ac, Cry1F, Cry1Fa2, Cry14Ab-1, Cry2Ab, Cry3A, Cry3Bb1, and Cry9C, and insecticidal proteins such as VIP1, VIP2, VIP3, and VIP3A, derived from *Bacillus thuringiensis*; insecticidal proteins derived from nematodes; toxins produced by aminals, such as scorpion toxins, spider toxins, bee toxins, and insect-specific neurotoxins; filamentous fungal toxins; plant lectin; agglutinin; protease inhibitors such as trypsin inhibitors, serine protease inhibitors, patatin, cystatin, and papain inhibitors; ribosome-inactivating proteins (RIPs) such as ricin, maize-RIP, abrin, saporin, and bryodin; steroid-metabolizing enzymes such as 3-hydroxysteroid oxidase, ecdysteroid-UDP-glucosyltransferase, and cholesterol oxidase; ecdysone inhibitors; HMG-CoA reductase; ion channel inhibitors such as sodium channel inhibitors and calcium channel inhibitors; juvenile hormone esterase; diuretic hormone receptors; stilbene synthase; bibenzyl synthase; chitinase; and glucanase.

Examples of the toxins expressed in such recombinant plants also include S-endotoxin proteins such as Cry1Ab, Cry1Ac, Cry1F, Cry1Fa2, Cry14Ab-1, Cry2Ab, Cry3A, Cry3Bb1, Cry9C, Cry34A, Cry34Ab, and Cry35Ab; hybrid toxins of insecticidal proteins such as VIP1, VIP2, VIP3, and VIP3A; partially deleted toxins; and modified toxins. The hybrid toxins are prepared by novel combination of different domains of these proteins using the recombinant technique. Known examples of the partially deleted toxins include Cry1Ab, whose amino acid sequence is partially deleted. The modified toxins have one or more amino acids substituted from the wild-type toxins.

Examples of these toxins, and recombinant plants capable of synthesizing these toxins, are described in, for example, patent documents such as EP 0374753 A, WO 93/007278, WO 95/034656, EP 0427529 A, EP 0451878 A, and WO 03/052073. With the toxins contained in these recombinant plants, resistance to especially coleopteran pests, dipteran pests, and lepidopteran pests can be given to the plants.

Further, recombinant plants containing one or more insecticidal, insect-pest resistance genes, and expressing one or more toxins, are already known, and some of them are commercially available. Examples of these recombinant plants include YieldGard <registered trademark> (a maize variety expressing the Cry1Ab toxin), YieldGard Rootworm <registered trademark> (a maize variety expressing the Cry3Bb1 toxin), YieldGard Plus <registered trademark> (a maize variety expressing the Cry1Ab and Cry3Bb1 toxins), Herculex I <registered trademark> (a maize variety expressing the Cry1Fa2 toxin, and phosphinothricin N-acetyltransferase (PAT) for giving resistance to glufosinate), NuCOTN33B <registered trademark> (a cotton variety expressing the Cry1Ac toxin), Bollgard I <registered trademark> (a cotton variety expressing the Cry1Ac toxin), Bollgard II <registered trademark> (a cotton variety expressing the Cry1Ac and Cry2Ab toxins), VIPCOT <registered trademark> (a cotton variety expressing the VIP toxin), NewLeaf <registered trademark> (a potato variety expressing the Cry3A toxin), NatureGard <registered trademark> Agrisure <registered trademark> GT Advantage (GA21 glyphosate resistant trait), Agrisure <registered trademark> CB Advantage (Bt11 corn borer (CB) trait), and Protecta <registered trademark>.

The useful plants described above also include plants to which a capacity to produce an anti-pathogenic substance having a selective action was given using the genetic recombination technique.

Examples of the anti pathogenic substance include PR proteins (PRPs, described in EP 0392225 A); ion channel inhibitors such as sodium channel inhibitors and calcium channel inhibitors (whose known examples include KP1, KP4, and KP6 toxins produced by viruses); stilbene synthase; bibenzyl synthase; chitinase; glucanase; and substances produced by microorganisms, such as peptide antibiotics, antibiotics containing a heterocycle, and protein factors involved in plant disease resistance (which is called the plant disease resistance gene, and described in WO 03/000906). Such anti-pathogenic substances, and recombinant plants producing these, are described in, for example, EP 0392225 A, WO 95/033818, and EP 0353191A.

The useful plants described above also include crops having useful traits such as oil component modification and amino acid content-increasing traits, which traits were given using the genetic recombination technique. Examples of such useful plants include VISTIVE <registered trademark> (low linolenic soybean, whose linolenic content is reduced) and high-lysine (high oil) corn (corn containing an increased amount of lysine or oil).

The useful plants described above also include crops to which useful traits such as resistance to dryness were given using the genetic recombination technique for maintaining or increasing the yields. Examples of such useful plants include DroughtGard <registered trademark> (corn to which resistance to dryness was given).

The weed control method according to the present invention exhibits a control effect also against the above-exemplified weed and the like that acquired resistance to existing herbicides. Further, the weed control method according to the present invention may be used for plants that acquired properties such as insect-pest resistance, disease resistance, and herbicide resistance by genetic recombination, artificial crossing, or the like.

In the present invention, plants to which resistance was given by the breeding method or the genetic recombination technique include not only plants to which the resistance was given by the classical crossing of varieties or to which the resistance was given by the genetic recombination technique, but also plants to which the resistance was given by new plant breeding techniques (NBTs) based on combination of the conventional crossing technique with molecular biological methods. The new plant breeding techniques (NBTs) is a generic term for breeding techniques that combine molecular biological techniques. The new plant breeding techniques (NBTs) are described in, for example, the book "Understanding of New Plant Breeding Techniques" (2013, Ryo Ohsawa and Hiroshi Ezura, International Academic Publishing Co., Ltd.), and the review article "Genre Editing Tools in Plants" ("Genes" vol. 8, p. 399 (2017, Tapan Kumar Mohanta, Tufail Bashir, Abeer Hasher, Elsayed Fathi Abd_Allah. and Hanhong Bae)). Examples of the new plant breeding techniques include the genome breeding technology and the genome editing technology. The genome breeding technology is a technology for efficient breeding using the genomic information, and includes the DNA marker (also called genome marker or gene marker) breeding technique and genomic selection. For example, DNA marker breeding is a method that uses DNA markers, which are DNA sequences marking the positions where particular useful-trait genes are present in the genome, to select progeny having desired useful-trait genes from a large number of the progeny after crossing. DNA marker breeding is characteristic in that, by using DNA markers for analyzing seedlings in the progeny after crossing, the time required for breeding can be effectively reduced.

Genomic selection is a method in which a prediction formula is prepared based on phenotypes and genomic information obtained in advance, to allow prediction of properties from the prediction formula and the genome information without carrying out evaluation of phenotypes. This is a technique that may contribute to achievement of efficient breeding. New plant breeding techniques (NBTs), for example, include cisgenesis/intragenesis, oligonucleotide-directed mutagenesis, RNA-dependent DNA methylation, genome editing, grafting to a GM rootstock or scion, reverse breeding, agroinfiltration, and seed production technology (SPT). Examples of tools for the genome editing technology include zinc-finger nucleases (ZFN, ZFNs), TALEN, CRISPR/Cas9, CRISPER/Cpf1, and meganuclease, which are capable of sequence-specific cleavage. Further, there are sequence-specific genome modification techniques such as CAS9 nickase and Target-AID, which were prepared by modification of the above-described tools.

The plants also include stacked varieties having a combination of a plurality of the above-described useful traits such as the classical herbicide traits or herbicide resistance genes, insecticidal insect-pest resistance genes, anti-pathogenic-substance-producing genes, oil component modification, amino acid content-increasing traits, and dryness-resistant traits.

EXAMPLES

The present invention is described below in detail by way of Examples and Test Examples. However, the present invention is not limited by these Examples.

Formulation Example 1

To 50 parts by mass of columnar crystals of pyroxasulfone obtained by the method described in Example 3-1 of Patent Document 2, 8 parts by mass of polycarboxylate, 5 parts of polyoxyethylene distyrylphenyl ether sulfate, and 1 part of alkylbenzene sulfonate, clay was added to prepare a total of 100 parts by mass of a mixture. The mixture was mixed and pulverized using an impact mill, to obtain a wettable powder.

Formulation Example 2

To 50 parts by mass of needle crystals of pyroxasulfone, 8 parts by mass of polycarboxylate, 5 parts of polyoxyethylene distyrylphenyl ether sulfate, and 1 part of alkylbenzene sulfonate, clay was added to prepare a total of 100 parts by mass of a mixture. The mixture was mixed and pulverized using an impact mill, to obtain a wettable powder.

Example 1

In a greenhouse at 25° C. in average (maximum, 30° C.; minimum, 25'C), a plastic pot having a size of 11 cut/II cut/II cm (length/width/depth) was filled with sandy loam (sand, 70.3%; silt, 17.3%; clay, 12.4%), and 15 seeds of *Echinochloa crus*-galli and 20 seeds of *Amaranthus retroflexus* were sown thereon, followed by covering the seeds with the sine soil to a thickness of 1 cm. Thereafter, the wettable powder of Formulation Example 1 was weighed and taken such that the amount of pyroxasulfone per hectare became 22.5 g. The wettable powder was diluted with water, and uniformly sprayed on the soil surface using a compact sprayer with a spray volume of 200 L per hectare. On the day of the treatment with the agent, on the next day of the treatment, and two days after the treatment, 10 mm each of rainfall, that is, a cumulative amount of 30 mm of rainfall, was artificially applied using an artificial rainfall apparatus. Thereafter, the *Echinochloa crus* galli plants and the *Amaranthus retroflexus* plants were grown, and, on Day 15, Day 20, and Day 29 after the treatment, the growth states of the *Echinochloa crus*-galli plants and the *Amaranthus retroflexus* plants were investigated to measure the degrees of growth inhibition in terms of the percentages relative to untreated groups. The same test was earned out in three replicates, and the average from the replicates was calculated to obtain a representative value.

Comparative Example 1

The test was carried out in the same manner as in Example 1 except that the wettable powder of Formulation Example 2 was used instead of the wettable powder of Formulation Example 1, and the growth states of the *Echinochloa crus* galli plants and the *Amaranthus retroflexus* plants were investigated.

The results of Example 1 and Comparative Example 1 are shown in Table 1 and Table 2.

TABLE 1

| Degree of growth inhibition in *Echinochloa crus-galli* (%) | Day 15 | Day 20 | Day 29 |
|---|---|---|---|
| Example 1 | 79 | 80 | 91 |
| Comparative Example 1 | 57 | 62 | 67 |

TABLE 2

| Degree of growth inhibition in *Amaranthus retroflexus* (%) | Day 15 | Day 20 | Day 29 |
|---|---|---|---|
| Example 1 | 83 | 94 | 98 |
| Comparative Example 1 | 53 | 68 | 76 |

The invention claimed is:

1. A method for controlling weeds, comprising treating soil having a clay content of less than 15% and a sand content of not less than 65% with columnar crystals of pyroxasulfone.

2. A method for controlling weeds, comprising treating soil having a clay content of less than 15% and a sand content of not less than 65% with an agrochemical formulation, wherein the agrochemical formulation is obtained through a step of pulverizing a powder or slurry comprising columnar crystals of pyroxasulfone.

3. The method according to claim 2, wherein the agrochemical formulation is a wettable powder, wettable granule, aqueous suspension, or oily suspension.

4. The method according to claim 1, wherein cumulative rainfall during the first 7 days after treating the soil is not less than 15 mm.

5. The method according to claim 2, wherein cumulative rainfall during the first 7 days after treating the soil is not less than 15 mm.

6. The method according to claim 3, wherein cumulative rainfall during the first 7 days after treating the soil is not less than 15 mm.

* * * * *